(12) United States Patent
Hopkins (10) Patent No.: US 6,737,476 B1
(45) Date of Patent: May 18, 2004

(54) RUBBER COMPOSITION

(75) Inventor: William Hopkins, Sarnia (CA)

(73) Assignee: Bayer Inc., Sarnia (CA)

( * ) Notice: Subject to any disclaimer, the term of this patent is extended or adjusted under 35 U.S.C. 154(b) by 139 days.

(21) Appl. No.: 10/048,281

(22) PCT Filed: Jul. 27, 2000

(86) PCT No.: PCT/CA00/00866

§ 371 (c)(1),
(2), (4) Date: Jan. 28, 2002

(87) PCT Pub. No.: WO01/09225

PCT Pub. Date: Feb. 8, 2001

(30) Foreign Application Priority Data

Jul. 29, 1999 (CA) .............................................. 2279085

(51) Int. Cl.⁷ .............................................. C08C 19/00
(52) U.S. Cl. .............................. 525/70; 525/72; 525/83; 525/84; 525/86; 525/87; 525/191; 525/192; 525/197; 525/212; 525/214
(58) Field of Search .............................. 525/70, 83, 84, 525/86, 87, 191, 192, 197, 212, 214, 72

(56) References Cited

U.S. PATENT DOCUMENTS

| 3,928,259 A | 12/1975 | Fenlak |
| 4,294,732 A | 10/1981 | Ohyachi et al. |
| 4,323,485 A | 4/1982 | Ahagon et al. ............. 525/237 |
| 4,786,680 A | 11/1988 | Suzuki et al. ............... 524/495 |
| 5,264,494 A | 11/1993 | Ho et al. .................... 525/237 |
| 5,342,896 A | 8/1994 | Jalics et al. ................. 525/193 |

FOREIGN PATENT DOCUMENTS

| EP | 0 513 620 | 11/1992 |
| GB | 870 947 | 6/1961 |

OTHER PUBLICATIONS

Organic Sulfur Compounds, Edited by N. Kharasch, vol. 1, (month unavailable) 1961, pp. 210–211, L. Bateman and C.G. Moore, Reactions of Sulfur With Olefins.

Primary Examiner—Jeffrey Mullis
(74) Attorney, Agent, or Firm—Joseph C. Gil; Jennifer R. Seng (57) ABSTRACT

A brominated butyl rubber and a polymer based on a conjugated diolefin monomer are grafted by mixing the solid polymer at a temperature greater than 50° C. for a time sufficient to cause grafting. The grafted copolymer is useful especially in tire tread compositions.

17 Claims, 5 Drawing Sheets

RUBBER COMPOSITION

FIELD OF THE INVENTION

This invention relates to a process for the grafting on to brominated butyl rubbers of polymers based on conjugated diolefin monomers and the use of these graft copolymers in rubber compositions that, upon vulcanization, exhibit improved physical properties. The graft copolymers are particularly, but not exclusively, suited for use in tire tread compositions.

BACKGROUND OF THE INVENTION

With the increasing demand for automobile safety and low fuel comsumption, specifications for rubber compounds for tire treads have become more demanding. Tire treads are required to be very tough and very wear resistant, to have a high degree of traction on both wet and dry surfaces, to provide low rolling resistance and heat build up and to retain their rubbery characteristics over a wide temperature range. However, some of these requirements are essentially incompatible with other requirements.

The addition of a butyl rubber to the tread formulation of a tire leads to an improvement in the wet skid resistance of the tire tread but there is a concomitant reduction in the wear resistance of the tire tread. Thus it would be desirable if the butyl rubber could be modified in a manner such that, when used in a tire tread formulation, the improved wet skid resistance is retained and, additionally, there is improved wear resistance while a desirable balance of the other physical properties is maintained.

As butyl rubbers have a very low level of unsaturation they do not have good compatibility with highly unsaturated rubbers such as polybutadiene or styrene-butadiene copolymers. Consequently several different grafting procedures have been developed by means of which further unsaturation may be introduced.

U.S. Pat. No. 5,264,494 discloses one process for preparing graft copolymers of halogenated butyl rubbers and polymers based on conjugated diolefin monomers. This process involves use of a solution of a chlorinated butyl rubber or a brominated butyl rubber, in a inert solvent, and a solution of a living, alkali metal terminated polymer based on conjugated diolefin monomers. This process is expensive and disadvantageous, as the living polymer is extremely sensitive to moisture and to impurities, so extreme precautions must be taken to protect it, the reaction mixture containing it and the halogenated butyl rubber, from moisture and impurities. Hence, the inert organic solvent or solvents must be moisture-free, and the reaction must be carried out under an inert atmosphere, for instance under nitrogen. Furthermore, ensuring that the polymers to be grafted are not contaminated with impurities can involve several washing steps, and the solvent or solvents must be removed from these washing steps and from the product after the reaction. For environmental reasons, it is desirable to avoid use of large volumes of organic solvents where possible.

U.S. Pat. No. 5,342,896 also relates to the preparation to graft copolymers composed of a halobutyl rubber and a polymer based on a diene monomer. This process uses a lithium-terminated diene-capped vinyl aromatic polymer that is reacted with the halobutyl rubber. The lithium-terminated diene-capped vinyl aromatic polymer can be prepared by adding a small amount of diene monomer to a solution of living lithium-terminated polystyrene. This reaction is carried out in an inert organic solvent such as cyclohexane and under an inert atmosphere. Again, precautions against moisture and impurities must be taken, in view of the moisture sensitivity and sensitivity to impurities of the living polymer and, again, organic solvents are used.

The present invention provides a process for preparing graft copolymers of brominated butyl rubbers and polymers based on conjugated diolefin monomers that does not involve use of living polymers and, therefore, avoids the disadvantages that accompany their use. It also avoids use of organic solvent in the formation of the graft copolymer.

SUMMARY OF THE INVENTION

The present invention provides a process for preparing a graft copolymer of a brominated butyl rubber and a polymer based on a conjugated diolefin monomer, which process comprises mixing a solid brominated butyl rubber with a solid polymer which is based on a conjugated diolefin monomer and which also includes some $C-S-(S)_n-C$ bonds, where n is an integer from 1 to 7, the mixing being carried out at a temperature greater than 50° C., for a period of time sufficient to cause grafting.

DETAILED DESCRIPTION OF THE INVENTION

It is necessary that the two polymers, the brominated rubber and the diene-based polymer, shall be mixed in a manner that ensures good dispersion within each other to ensure reaction between the reactive groups of the two polymers. Conditions that ensure the required dispersion occur in internal mixers such as Banbury mixers, and Haake and Brabender miniature internal mixers. A two roll mill mixer also provides good dispersion of one polymer within another. An extruder provides good mixing and permits a shorter reaction time. It is possible to carry out the mixing in two or more stages, and the mixing can be done in different apparatus, for example one stage in an internal mixer and one stage in an extruder.

The temperature of the mixed polymers is important, and should be greater than 50° C., preferably greater than 60° C., to ensure that the grafting reaction occurs to a significant extent. At high temperatures there may occur significant deterioration of the polymers in the form of crosslinking, causing gelation, or chain scission, and the mixing should be done at a temperature that does not cause this deterioration to occur. For this reason the temperature should not normally exceed 180° C. A temperature in the range from 60° to 160° C. is preferred and a temperature in the range from 80° to 140° C. is particularly preferred. Deterioration is worsened if a high temperature is maintained for a long period of time; the lower the temperature, the longer the polymers can be mixed.

When using mill rollers to mix the polymers to form the graft, the temperature of the mill rollers can be set, and mixing commenced. As mixing proceeds the temperature of the polymer mixture is measured, and this may be quite different from the temperature of the mill rollers. When reference is made to the temperature at which mixing is proceeding, it is the temperature of the polymer mixture that is being referred to.

The time period over which mixing is carried out can vary over wide limits. The time required for mixing varies with the extent of mixing. If mixing is done in an extruder the mixing is more efficient than if done in a mixer, and hence less time is required. The time may be as little as one minute or may be two hours or more. More often it is between 1 and 20 minutes. The fact that grafting has occurred can be demonstrated by means of a simple test. Brominated butyl rubbers and polymers based on conjugated diolefin monomers can be dissolved in hexane to achieve a solution of 5 g rubber, or 5 g polymer, in 100 g hexane. If an ungrafted mixture of brominated butyl rubber and polymer of conjugated diolefin is dissolved in hexane and left to stand at room temperature there occurs separation into two phases, within two or three hours, as the brominated butyl rubber remains in solution but the polymer of conjugated diolefin precipitates out. In contrast, if the brominated butyl rubber and polymer of conjugated diolefin have been mixed at a temperature above 50° C., to cause grafting, and the product of the mixing is dissolved in hexane, little or no settling occurs over several days, indicating that a large part, or all, of the brominated butyl rubber and polymer of conjugated diene have grafted. Another indication that grafting has occurred is that the glass transition temperature, Tg, of the grafted copolymer is shifted, as compared with the Tg of the ungrafted bromobutyl rubber and the Tg of the polymer based on the conjugated diolefin.

It is possible to carry out a pre-mixing step, at a temperature below 50° C., before the polymeric mixture is subjected to mixing at a temperature above 50° C. to cause grafting.

The brominated butyl rubbers suitable for use in this invention are obtained by bromination of butyl rubber, which is a copolymer of isobutylene and a comonomer that is usually a C4 to C6 conjugated diolefin, preferably isoprene. Comonomers other than conjugated diolefins can be used, however, and mention is made of alkyl-substituted vinyl aromatic comonomers such as $C_1$–$C_4$-alkyl substituted styrene. One example that is commercially available is brominated isobutylene methylstyrene copolymer (BIMS) in which the comonomer is p-methylstyrene.

Brominated butyl rubber typically contains in the range of from 1 to 3 weight percent of isoprene and in the range of from 97 to 99 weight percent of isobutylene based on the hydrocarbon content of the polymers, and in the range of from 1 to 4 weight percent bromine based on the bromobutyl polymer. A typical bromobutyl polymers has a molecular weight, expressed as the Mooney (ML 1+8 at 125° C.) according to DIN 53 523, of in the range of 28 to 55.

In the process of the present invention the brominated butyl rubber preferably contains in the range of from 1 to 2 weight percent of isoprene and in the range of from 98 to 99 weight percent of isobutylene based on the hydrocarbon content of the polymer and in the range of from 0.5 to 2.5 weight percent, preferably in the range of from 0.75 to 2.3 weight percent, of bromine based on the brominated butyl polymer.

A stabilizer may be added to the brominated butyl rubber. Suitable stabilizers include calcium stearate and epoxidized soyabean oil, preferably used in an amount of in the range of from 0.5 to 5 parts by weight per 100 parts by weight of the brominated butyl rubber.

Potentially any polymer containing carbon-carbon double bonds can be sulphurised, for example by reaction with $S_2Cl_2$, and then grafted with the brominated butyl rubber, and mention is made of polymers and copolymers of conjugated diolefins. Such conjugated diolefin polymers and copolymers can be prepared using a number of different catalyst systems. Mention is made of anionic systems, systems based on transition metals, systems based on lanthanide metals, for example neodymium, and free radical systems. The conjugated diolefins generally have the structural formula:

wherein R is a hydrogen atom or an alkyl group containing from 1 to 8 carbon atoms and wherein $R_1$ and $R_{11}$ can be the same or different and are selected from the group consisting of hydrogen atoms and alkyl groups containing from 1 to 4 carbon atoms. Some representative nonlimiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing from 4 to 8 carbon atoms are preferred, 1,3-butadiene and isoprene being especially preferred.

The polymer based on a conjugated diene monomer can be a homopolymer, or a copolymer of two or more conjugated diene monomers, or a copolymer with a vinyl aromatic monomer.

The vinyl aromatic monomers which can optionally be used are selected so as to be copolymerizable with the conjugated diolefin monomers being employed. Generally, any vinyl aromatic monomer which is known to polymerize with organo alkali metal initiators can be used. Such vinyl aromatic monomers usually contain from 8 to 20 carbon atoms, preferably from 8 to 14 carbon atoms. Some examples of vinyl aromatic monomers that can be copolymerized include styrene, alpha-methyl styrene, various alkyl styrenes, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene.

Preferred polymers based on conjugated diolefin monomers, for grafting onto the brominated butyl rubber, are selected from the group consisting of butadiene rubbers, styrene-butadiene random and block rubbery copolymers and styrene-isoprene-butadiene rubber and mixtures thereof, preferably from the group consisting of butadiene rubbers, styrene-butadiene random copolymers and mixtures thereof, and more preferably from butadiene rubbers.

The relative amount of conjugated diolefin monomers and vinyl aromatic monomers employed can vary over a wide range. However, in general at least 50 mole percent conjugated diolefin monomers are required in order to produce a rubbery copolymer. Thus the mole ratio of conjugated diolefin monomers to vinyl aromatic monomers will be in the range of 50:50 to 99:1. More typically the mole ratio of conjugated diolefin monomers to vinyl aromatic monomers will be in the range of 65:35 to 95:5.

The vinyl content in the conjugated diolefin portion of the polymer chain may be controlled by the use of a microstructure controlling agent such as an ether or a tertiary amine. Representative nonlimiting examples of ethers that may be used as microstructure controlling agents include dioxane, tetrahydrofuran and derivatives thereof, ethylene glycol diethyl ether, ethylene glycol dimethyl ether, diethylene glycol dimethyl ether, diethylene glycol diethyl ether, triethylene glycol dimethyl ether and derivatives thereof or the like.

Representative nonlimiting examples of tertiary amines include triethylamine, N,N,N',N'-tetramethylethylenediamine and the like. The amount of the microstructure controlling agent varies depending upon the microstructure of the desired conjugated diolefin containing polymer or the conjugated diolefin-vinyl substituted aromatic monomer copolymer and it is in the range of from 0.05 to 2,000 moles, preferably 0.2 to 1,000 moles per mole of organometallic catalyst.

The polymerization process can be carried out at any temperature within the range of –80° C., to 150° C. but preferably the polymerization process is carried out at a temperature of in the range of –20° C., to 80° C.

The polymer based on conjugated diolefin monomers contains C—S—(S)$_n$—C bonds, where n is an integer from 1 to 7 and the free valence bond may be satisfied by any of several atoms, including carbon, hydrogen or nitrogen. These bonds can be introduced, for instance, by reacting a polymer based on conjugated diolefin monomers with a sulphurising agent, for instance sulphur dibromide or, preferably, sulphur dichloride, $S_2Cl_2$, resulting in the formation of C—S—(S)$_n$—C bonds between polymeric chains. It is believed that when the diolefin is butadiene and the sulphurising agent is sulfur dichloride the structure connecting the chains is as follows:

If the sulphurising agent is sulphur dichloride or sulphur dibromide, then n usually takes the value of 1. Other sulfurising agents, for example sulphur, $S_n$, result in higher values of n up to 7. See, for example, Organic Sulphur Compounds, edited by M. Kharasch, Pergamon Press, pages 210 and 211, incorporated herein by reference.

The polymer based on the conjugated diene generally contains from 0.001 to 5 weight percent of sulphur based on the weight of the polymer, preferably from 0.01 to 1 weight percent.

The sulphurising agent can be reacted with the polymer by addition of the sulphurising agent, preferably sulphur dichloride, to the final stage of the polymerization reaction by which the polymer is formed, or by reacting the polymer with sulphur dichloride after the polymerization reaction has been completed. Two sulphur containing polybutadienes are commercially available from Bayer under the trade marks BUNA CB24 and BUNA CB25.

The weight ratio of the brominated butyl rubber to the polymer based on conjugated diolefin monomers can vary between wide limits and is suitably in the range from 90:10 to 10:90 preferably from 70:30 to 30:70. For many purposes a 50:50 ratio is suitable.

On completion of the reaction suitable antioxidants may be added to the graft copolymer. Suitable antioxidants include sterically hindered phenols, preferably used in the amount of in the range of 0.005 to 2 parts by weight per 100 parts by weight of the graft copolymer.

The graft-polymer itself, a rubber composition containing said graft-polymer, a vulcanized rubber composition containing said graft-polymer and a rubber article made of said rubber composition containing said graft-polymer are further objects of the invention.

The disclosed graft polymers can be compounded with at least one rubbery polymer selected from the group consisting of butadiene rubbers, styrene-butadiene random and block copolymers and styrene-isoprene-butadiene random and block copolymers and styrene-isoprene-butadiene rubber, and with carbon black and vulcanization agents. Preferably in the range of from 10 to 90 parts by weight of the graft copolymer are compounded with in the range of from 90 to 10 parts by weight of at least one rubbery polymer for a total of 100 parts by weight of the total of the graft copolymer and rubbery polymers. More preferably, in the range of from 10 to 50 parts by weight of the graft copolymer are compounded with in the range of from 90 to 50 parts by weight of rubbery polymer.

The rubber compositions further comprise natural rubber and/or synthetic rubbery polymers based upon conjugated diolefinic monomers which are compatible and covulcanizable with the aforesaid graft copolymer. Preferably in the range of from 10 to 90 parts by weight of at least one rubbery polymer selected from the group consisting of butadiene rubbers, styrene-butadiene random and block rubbery copolymers, isoprene rubber and natural rubber are mixed with in the range of from 90 to 10 parts by weight of the graft copolymer for a total of 100 parts by weight of the polymers. More preferably, in the range of from 50 to 90 parts of rubbery polymer are mixed with in the range of from 50 to 10 parts of graft copolymer.

The use of carbon blacks for reinforcement of vulcanizates is well known in the art and results in improved strength properties of the final vulcanizates. Suitable carbon blacks for practicing this invention include the well known furnace and channel, preferably furnace, blacks and are used in amounts of in the range of from 30 to 150 parts by weight per 100 parts of rubber. Other suitable fillers include silica, clays, and mixtures of silica and carbon black.

The curing system suitable for use in the present invention is not particularly restricted. A typical curing system comprises: (i) a metal oxide; (ii) optionally, elemental sulphur and (iii) at least one sulphur based accelerator. The use of metal oxides as a curing component is well known in the art. A suitable metal oxide is zinc oxide, which may be used in amounts of in the range of from 1 to 10, preferably from 2 to 5, parts by weight. Elemental sulphur, comprising component (ii) of said curing system, when present, may be used in amounts of in the range of from 0.2 to 2 parts by weight. Suitable sulphur accelerators (component (iii) of said curing system) may be used in amounts of in the range of from 0.5 to 3 parts by weight and include the thiuram sulphides such as tetramethyl thiuram disulphide (TMTD), the thiocarbamates such as zinc dimethyl dithiocarbamate (ZDC) and the sulfenamides such as N-cyclohexyl-2-benzothiazol sulfenamide. Preferably the sulphur based accelerator is N-cyclohexyl-2-benzo-thiazole sulfenamide.

Stabilizers, anti-oxidants, hydrocarbon extender oils and tackifiers may also be added as is well known in the art of compounding.

The compositions containing the graft copolymer according to the present invention, together with the further natural rubber or synthetic rubbery polymer can be prepared by the well known methods for mixing rubbery polymers including mixing on a rubber mill or in internal mixers of the Banbury or Brabender variety. Generally it is preferred to carry out the compounding procedure in two stages. In the first stage the polymers may be mixed with conventional compounding ingredients; these may include carbon black, hydrocarbon extender oil, tackifiers, stabilizers, processing acids and antioxidants. In the second stage of the compounding procedure, the cure active agents are preferably added to the compound described above on a rubber mill or in an internal mixer operated at a temperature not normally in excess of 60° C. The compounds are cured in a conventional manner by heating in the range of from 5 to 60 minutes at temperatures in the range of from 150° C. to 200° C. to form elastomeric vulcanizates.

After vulcanization, the rubber compositions hereinbefore described exhibit an improved balance of physical properties. By physical properties is meant hardness and elongation and strength properties which include modulus at 100 percent elongation, modulus at 300 percent elongation and tensile strength at rupture.

As stated above, the graft polymers themselves or compositions containing said graft polymers or vulcanized compositions containing said graft polymers are partially suited for use in tire tread compositions. They are also useful, however, for manufacturing all kind of articles, especially belts such as conveyer belts, and rolls. They display good damping properties and are, therefore, also useful in isolators against vibration and in mounts and bushings.

The following examples illustrate the present invention and are not intended to limit the scope thereof. All parts are parts by weight unless otherwise specified. The accompanying drawings are graphs showing properties of the grafts of the invention.

In the examples use is made of the polymers described below: POLYSAR® BB2040 (POLYSAR is a registered trademark of Bayer Ag.) is a brominated butyl nibber that is available from Bayer. It has a Mooney viscosity (RPML 1+8 @ 125° C.) of 39±4, a bromine content of 2.0±0.3 wt %. and an approximate molecular weight of 500,000 grams per mole.

POLYSAR PB301 is a butyl rubber that has a Mooney viscosity (RPML 1+8 @ 125° C.) of 51±5 and an isoprene content of 1.75±0.2 mole %, and POLYSAR CB1240 is a chlorinated butyl rubber that has a Mooney viscosity (RPML 1+8 @ 125° C.) of 38±4 and a chlorine content of 1.25±0.1 wt %.

These polymers are all commercially available from Bayer, Inc., Sarnia, Ontario, Canada.

EXAMPLES

Example 1

A blend of a polybutadiene which contained C—S—S—C bonds (BUNA CB24 from Bayer) and a brominated butyl rubber (POLYSAR BB2040 from Bayer) were mixed on a cool mill at 50° C. Blends of BUNA CB24 and a chlorinated butyl rubber (POLYSAR CB1240 from Bayer) and of BUNA CB 24 and a non-halogenated butyl rubber (POLYSAR PB301 from Bayer) were also mixed in a similar manner.

From samples of the blends there were prepared 5% solutions of the blends in hexane. These solutions were allowed to stand at room temperature and, after two hours, separation into two phases occurred, with the polybutadiene precipitated.

Other samples of the blends were mixed and heated for up to 25 minutes in a miniature internal mixer (Haake) equipped with a 75 ml capacity head. The starting temperature was 130° C. and the speed was 60 rpm. The rubber temperature increased to 145° C. during the reaction.

The blend of BUNA CB24 and POLYSAR BB2040, after mixing from 5–15 minutes in the Haake mixer, was dissolved in hexane. No significant separation in the solution occurred over several days, indicating substantial grafting between the polybutadiene and the brominated butyl rubber. In contrast, solutions in hexane of the blends of BUNA CB24 and POLYSAR CB1240, and of BUNA CB24 and POLYSAR PB301, did separate, indicating that the mixing in the Haake mixer had not caused grafting between the polybutadiene and the chlorinated butyl rubber or non-halogenated butyl rubber.

Example 2

Blends of polybutadiene (BUNA CB24 or BUNA CB25; see Table 1 below) with brominated butyl rubber (POLYSAR BB2040) were prepared in proportions 30:70, 50:50 and 70:30. Each blend was subjected to mixing in a model B Banbury mixer. The starting temperature was 35° C. The blends were mixed for the time periods specified in Table 1 below, during which time the rubber temperature rose to 140–150° C. The temperatures of the grafted copolymers when dumped from the Banbury mixer are given in Table 1.

Solutions of 5% polymer in hexane showed no significant separation on being held at room temperature for longer than 24 hours, indicating that grafting had occurred. The grafted polymers were then mixed with oil and ingredients normally used in curing or vulcanizing, as follows:

| | |
|---|---|
| Grafted polymer | 100 |
| Sundex 790 (processing oil) | 10 |
| Stearic acid | 1.5 |
| Zinc oxide | 3 |
| Sulphur | 1.4 |
| CBS (N-cyclohexyl-2-benzo-thiazole sulfenamide) | 0.8 |

Figure 1:
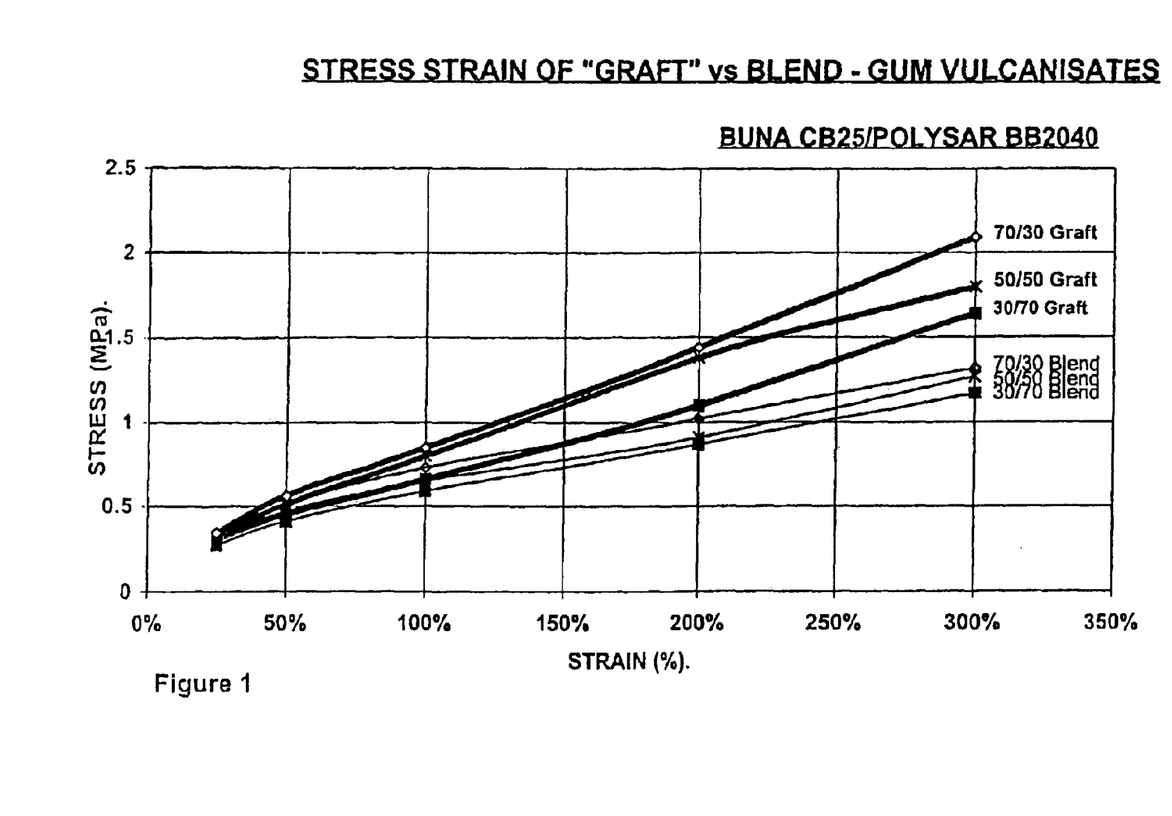
FIG. 1 illustrates the Stress versus Strain of Graft of Blend Rubbers Vulcanisates.

Samples of these were then cured at 170° C. in a moving die cure rheometer (MDR). The optimum curing time, defined as t90+5 minutes, at 170° C. was determined. Further samples were then cured for t90+5 minutes at 170° C., and stress/strain properties were determined. Ungrafted blends of BUNA CB24 or BUNA CB25 and POLYSAR BB2040 were also mixed with the same ingredients, cured in the same manner and their stress/strain properties determined, to serve as controls. Results are given in Table 1 and are shown graphically in FIG. 1. It is clear that all the compositions containing grafted copolymer show tensile strength superior to the compositions containing ungrafted blends of polymers.

In Table 1:

column A gives results obtained when BUNA CB25 and POLYSAR BB2040 were blended in equal proportions and mixed for 16 minutes to cause grafting. Results are also given for an ungrafted blend of BUNA CB25 and also POLYSAR BB2040. The values obtained with the graft copolymer, divided by the values obtained with the ungrafted blend and expressed as a percentage, are also given;

column B gives results obtained when BUNA CB24 and POLYSAR BB2040 were blended in equal proportions and mixed for 16 minutes to cause grafting;

column C gives results obtained when BUNA CB25 and POLYSAR BB2040 were blended in equal proportions and mixed for 7 minutes to cause grafting;

column D gives results obtained when 70 parts of BUNA CB25 and 30 parts of POLYSAR BB2040 were blended and mixed for 16 minutes to cause grafting. Results are also given for an ungrafted 70/30 blend of BUNA CB25 and POLYSAR BB2040; and column E gives results obtained when 30 parts of BUNA CB25 and 70 parts of POLYSAR BB2040 were blended and mixed for 17 minutes to cause grafting. Results are also given for an ungrafted 30/70 blend of BUNA CB25 and POLYSAR BB2040.

TABLE 1

|  | Column A | | Column B | | Column C | |
| --- | --- | --- | --- | --- | --- | --- |
| Grafting time (mins.) | 0 (Blend) | 16 | 16 | | 7 | |
| Dump Temperature (° C.) |  | 147 | 147 | | 147 | |
| BUNA CB24 | — | — | 50 | | — | |
| BUNA CB25 | 50 | 50 | — | | 50 | |
| Polysar BB2040 | 50 | 50 | 50 | | 50 | |
| SUNDEX 790 | 10 | 10 | 10 | | 10 | |
| Stearic Acid | 1.5 | 1.5 | 1.5 | | 1.5 | |
| ZnO | 3 | 3 | 3 | | 3 | |
| S | 1.4 | 1.4 | 1.4 | | 1.4 | |
| CBS | 0.8 | 0.8 | 0.8 | | 0.8 | |
| Strength Stress Strain ($t'_{90}$ + 5 @ 170° C., die c.dumbells @ RT | | (G/B) % * | | (G/B) % * | | (G/B) % * |
| Hardness Shore A2 Inst. (pts) | 31 | 34 | 110 | 32 | 103 | 31 | 100 |
| Ultimate Tensile (MPa) | 1.22 | 2.17 | 178 | 1.72 | 148 | 1.93 | 158 |
| Ultimate Elongation (%) | 335 | 330 | 99 | 280 | 84 | 365 | 109 |
| Stress @ 25 (MPa) | 0.31 | 0.32 | 103 | 0.35 | 113 | 0.32 | 103 |
| Stress @ 50 (MPa) | 0.47 | 0.51 | 109 | 0.52 | 111 | 0.51 | 109 |
| Stress @ 100 (MPa) | 0.65 | 0.8 | 123 | 0.77 | 118 | 0.72 | 111 |
| Stress @ 200 (MPa) | 0.91 | 1.38 | 152 | 1.18 | 130 | 1.09 | 120 |
| Stress @ 300 (MPa) | 1.27 | 1.8 | 142 |  |  | 1.51 | 119 |
| MDR Cure characteristics (1.7 Hz, 3° arc, 30 mins. @ 170° C.) | | | | | | |
| MH (dN.m) | 29.48 | 28.11 | 95 | 28.05 | 95 | 29.1 | 99 |
| ML (dN.m) | 4.89 | 4.09 | 84 | 4.61 | 94 | 4.55 | 93 |
| t' 90 (min) | 15.41 | 16.48 | 107 | 16.47 | 107 | 16.09 | 104 |

|  | Column D | | Column E | |
| --- | --- | --- | --- | --- |
| Grafting time (mins.) | 0 (Blend) | 16 | 0 (Blend) | 17 |
| Dump Temperature (° C.) |  | 150 |  | 143 |
| BUNA CB24 | — | — | — | — |
| BUNA CB25 | 70 | 70 | 30 | 30 |
| Polysar BB2040 | 30 | 30 | 70 | 70 |
| SUNDEX 790 | 10 | 10 | 10 | 10 |
| Stearic Acid | 1.5 | 1.5 | 1.5 | 1.5 |
| ZnO | 3 | 3 | 3 | 3 |
| S | 1.4 | 1.4 | 1.4 | 1.4 |
| CBS | 0.8 | 0.8 | 0.8 | 0.8 |

TABLE 1-continued

| Strength Stress Strain ($t'_{90}$ + 5 @ 170° C., die c.dumbells @ RT | | (G/B) % * | | | (G/B) % * |
| --- | --- | --- | --- | --- | --- |
| Hardness Shore A2 Inst. (pts) | 34 | 32 | 94 | 29 | 30 | 103 |
| Ultimate Tensile (MPa) | 1.49 | 2.09 | 140 | 2.51 | 2.76 | 110 |
| Ultimate Elongation (%) | 3.85 | 260 | 68 | 565 | 445 | 79 |
| Stress @ 25 (MPa) | 0.33 | 0.34 | 103 | 0.27 | 0.30 | 111 |
| Stress @ 50 (MPa) | 0.51 | 0.56 | 110 | 0.41 | 0.45 | 110 |
| Stress @ 100 (MPa) | 0.73 | 0.85 | 116 | 0.59 | 0.66 | 112 |
| Stress @ 200 (MPa) | 1.02 | 1.44 | 141 | 0.87 | 1.10 | 126 |
| Stress @ 300 (MPa) | 1.32 | 2.09 | 158 | 1.17 | 1.64 | 140 |
| MDR Cure characteristics (1.7 Hz, 3° arc, 30 mins. @ 170° C.) | | | | | | |
| MH (dN.m) | 36 | 34.23 | 95 | 21.98 | 21.49 | 98 |
| ML (dN.m) | 5.04 | 4.83 | 96 | 4.75 | 4.15 | 87 |
| t' 90 (min) | 19.16 | 19.24 | 100 | 12.23 | 13.11 | 107 |

* (property measured with Graft/property measured with Blend) × 100

Figure 2:
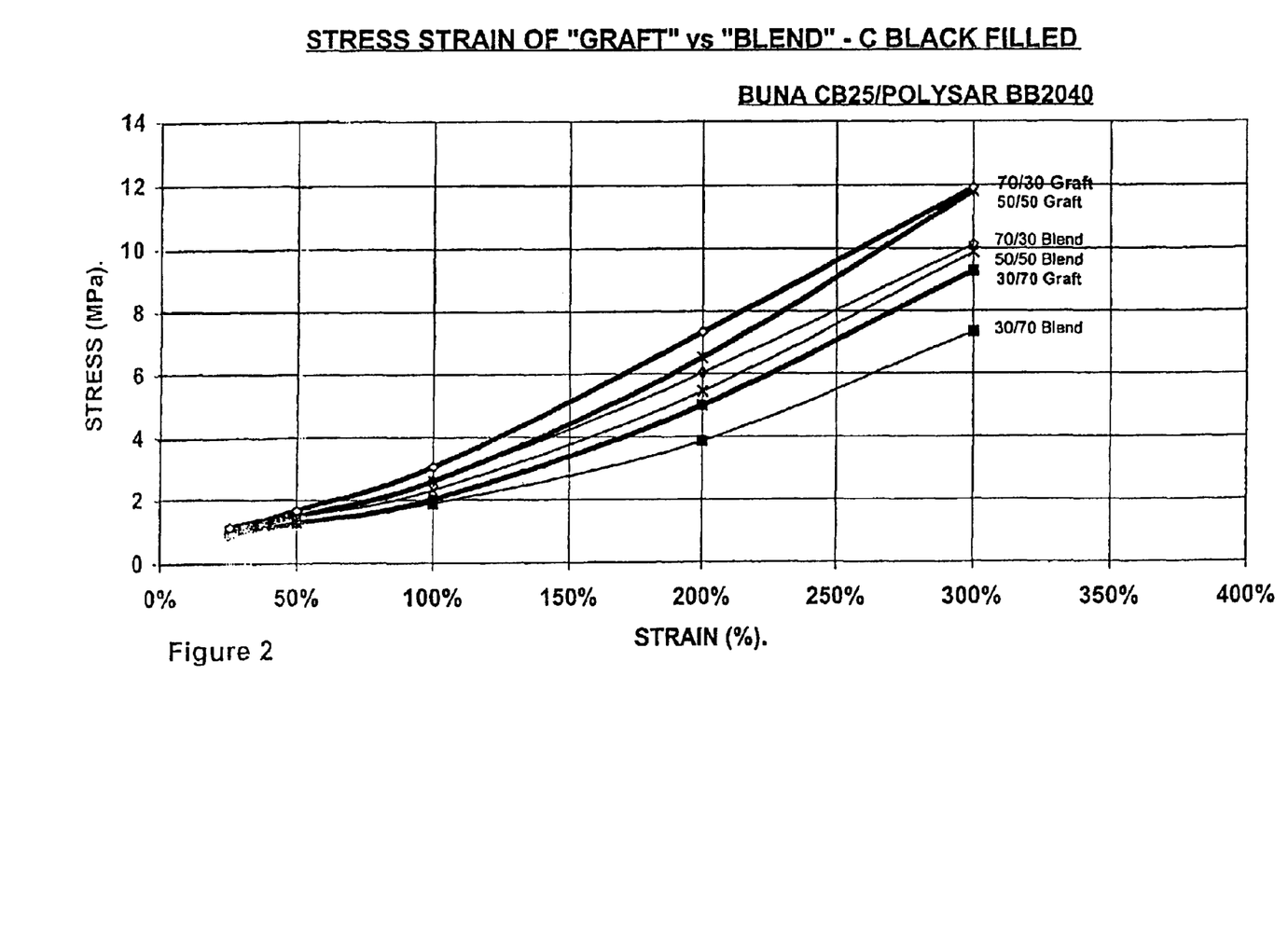
FIG. 2 illustrates the Stress versus Strain of Graft of Blends filled with Carbon Black.

Compositions similar to those whose properties are given in Table 1, but to which carbon black had been added as filler, were made and tested under the same conditions as the compositions of Table 1. The results are given in Table 2 and shown graphically in FIG. 2.

In Table 2:

column A gives results obtained when BUNA CB25 and POLYSAR BB2040 were blended in equal proportions and mixed for 18 minutes to cause grafting. Results are also given for an ungrafted blend of BUNA CB25 and POLYSAR BB2040. The values obtained with the graft copolymer, divided by the values obtained with the ungrafted blend and expressed as a percentage, are also given;

column B gives results obtained when BUNA CB24 and POLYSAR BB2040 were blended in equal proportions and mixed for 16 minutes to cause grafting;

column C gives results obtained when BUNA CB24 and POLYSAR BB2040 were blended in equal proportions and mixed for 7 minutes to cause grafting;

column D gives results obtained when 70 parts of BUNA CB25 and 30 parts of POLYSAR BB2040 were blended and mixed for 16 minutes to cause grafting. Results are also given for an ungrafted 70/30 blend of BUNA CB25 and POLYSAR BB2040; and column E gives results obtained when 30 parts of BUNA CB25 and 70 parts of POLYSAR BB2040 were blended and mixed for 17 minutes to cause grafting. Results are also given for an ungrafted 30/70 blend of BUNA CB25 and POLYSAR BB2040.

TABLE 2

|  | Column A | | Column B | Column C |
| --- | --- | --- | --- | --- |
| Grafting time (mins.) | 0 (Blend) | 18 | 18 | 7 |
| BUNA CB24 | — | — | 50 | — |
| BUNA CB25 | 50 | 50 | — | 50 |
| Polysar BB2040 | 50 | 50 | 50 | 50 |
| N-339 | 50 | 50 | 50 | 50 |
| SUNDEX 790 | 10 | 10 | 10 | 10 |
| Stearic Acid | 1.5 | 1.5 | 1.5 | 1.5 |
| ZnO | 3 | 3 | 3 | 3 |
| S | 1.4 | 1.4 | 1.4 | 1.4 |

TABLE 2-continued

| | | | | | | | |
|---|---|---|---|---|---|---|---|
| CBS | 0.8 | 0.8 | | 0.8 | | 0.8 | |
| Strength Stress Strain ($t'_{90}$ + 5 @ 170° C., die c.dumbells @ RT | | (G/B) % * | | | (G/B) % * | | (G/B) % * |
| Cure Time (min) | 21 | 21 | | 21 | | 20 | |
| Hardness Shore A2 Inst. (pts) | 60 | 60 | 100 | 58 | 97 | 60 | 100 |
| Ultimate Tensile (MPa) | 14.64 | 15.64 | 107 | 18.89 | 115 | 15.8 | 108 |
| Ultimate Elongation (%) | 400 | 380 | 95 | 430 | 108 | 415 | 104 |
| Stress @ 25 (MPa) | 1.03 | 1.02 | 99 | 1.01 | 98 | 1.07 | 104 |
| Stress @ 50 (MPa) | 1.43 | 1.49 | 104 | 1.41 | 99 | 1.48 | 103 |
| Stress @ 100 (MPa) | 2.31 | 2.59 | 112 | 2.45 | 106 | 2.39 | 103 |
| Stress @ 200 (MPa) | 5.45 | 6.51 | 119 | 6.01 | 110 | 5.73 | 105 |
| Stress @ 300 (MPa) | 9.86 | 11.8 | 120 | 10.82 | 110 | 10.32 | 105 |
| MDR Cure characteristics (1.7 Hz, 3° arc, 30 mins. @ 170° C.) | | | | | | | |
| MH (dN.m) | 37.78 | 39.68 | 105 | 40.27 | 107 | 38.4 | 102 |
| ML (dN.m) | 7.33 | 7.34 | 100 | 7.41 | 101 | 7.49 | 102 |
| t' 90 (min) | 16.39 | 15.58 | 95 | 16.39 | 100 | 15.23 | 93 |

| | Column D | | | Column E | | |
|---|---|---|---|---|---|---|
| Grafting time (mins.) | 0 (Blend) | 16 | | 0 (Blend) | 17 | |
| BUNA CB24 | — | — | | — | — | |
| BUNA CB25 | 70 | 70 | | 30 | 30 | |
| Polysar BB2040 | 30 | 30 | | 70 | 70 | |
| N-339 | 50 | 50 | | 50 | 50 | |
| SUNDEX 790 | 10 | 10 | | 10 | 10 | |
| Stearic Acid | 1.5 | 1.5 | | 1.5 | 1.5 | |
| ZnO | 3 | 3 | | 3 | 3 | |
| S | 1.4 | 1.4 | | 1.4 | 1.4 | |
| CBS | 0.8 | 0.8 | | 0.8 | 0.8 | |
| Strength Stress Strain ($t'_{90}$ + 5 @ 170° C., die c.dumbells @ RT | | (G/B) % * | | | (G/B) % * | |
| Cure Time (min) | 23 | 23 | | 19 | 19 | |
| Hardness Shore A2 Inst. (pts) | 58 | 58 | 100 | 60 | 63 | 105 |
| Ultimate Tensile (MPa) | 16.76 | 15.21 | 81 | 15.17 | 14.43 | 95 |
| Ultimate Elongation (%) | 525 | 420 | 80 | 430 | 370 | 86 |
| Stress @ 25 (MPa) | 0.94 | 0.89 | 95 | 1.08 | 1.12 | 104 |
| Stress @ 50 (MPa) | 1.27 | 1.26 | 99 | 1.54 | 1.66 | 108 |
| Stress @ 100 (MPa) | 1.88 | 2.01 | 107 | 2.62 | 3.05 | 116 |
| Stress @ 200 (MPa) | 3.88 | 5 | 130 | 6.03 | 7.32 | 121 |
| Stress @ 300 (MPa) | 7.32 | 9.27 | 127 | 10.11 | 11.91 | 118 |
| MDR Cure characteristics (1.7 Hz, 3° arc, 30 mins. @ 170° C.) | | | | | | |
| MH (dN.m) | 41.9 | 43.64 | 105 | 34.8 | 35.7 | 103 |
| ML (dN.m) | 7.5 | 7.6 | 101 | 7.13 | 7.09 | 99 |
| t' 90 (min) | 16.01 | 18.24 | 101 | 14.44 | 14.35 | 99 |

* (property measured with Graft/property measured with Blend) × 100

Figure 3:
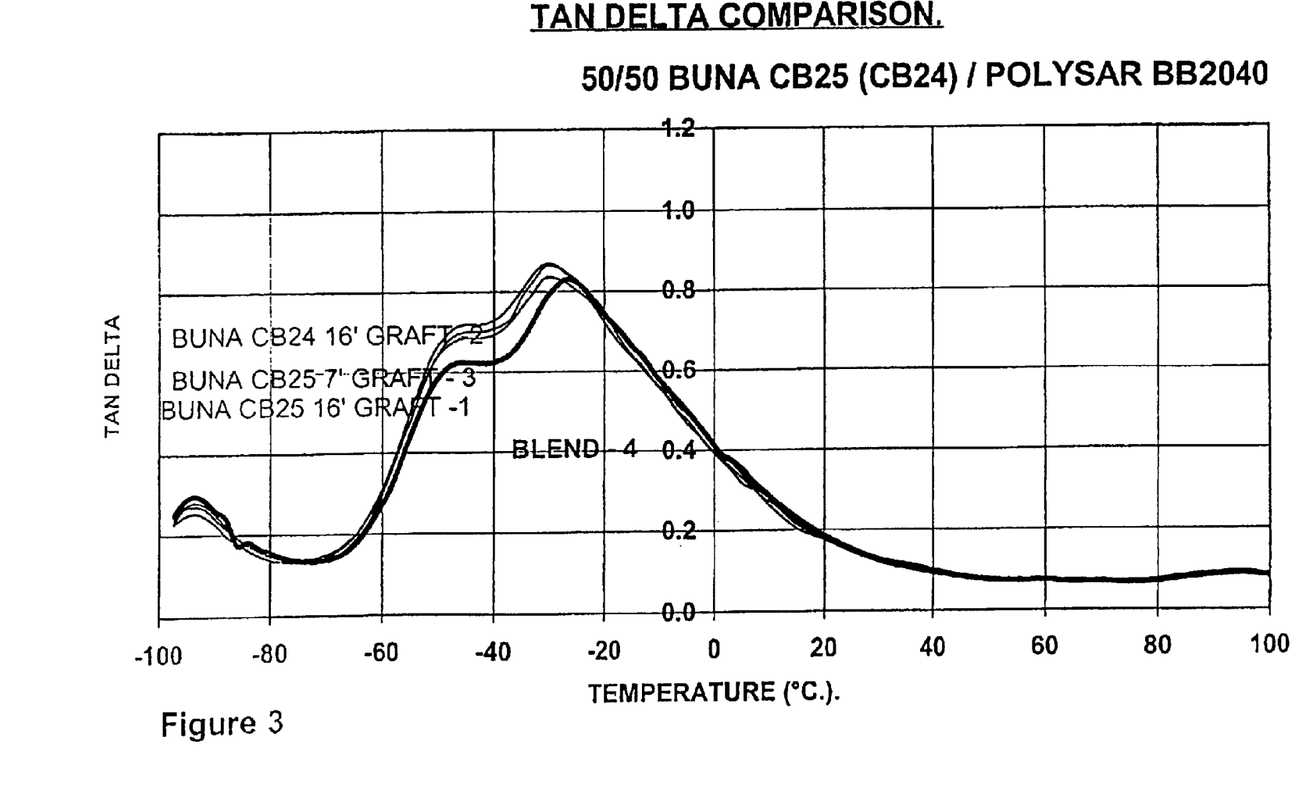
FIG. 3 illustrates the tan ($\delta$) versus temperature for a 50/50 blend of a brominated butyl rubber and sulphurised polymer based on conjugated diolefin monomers and for 50/50 grafts of POLYSAR BB2040 with BUNA CB24 and BUNA 25.
Figure 4:
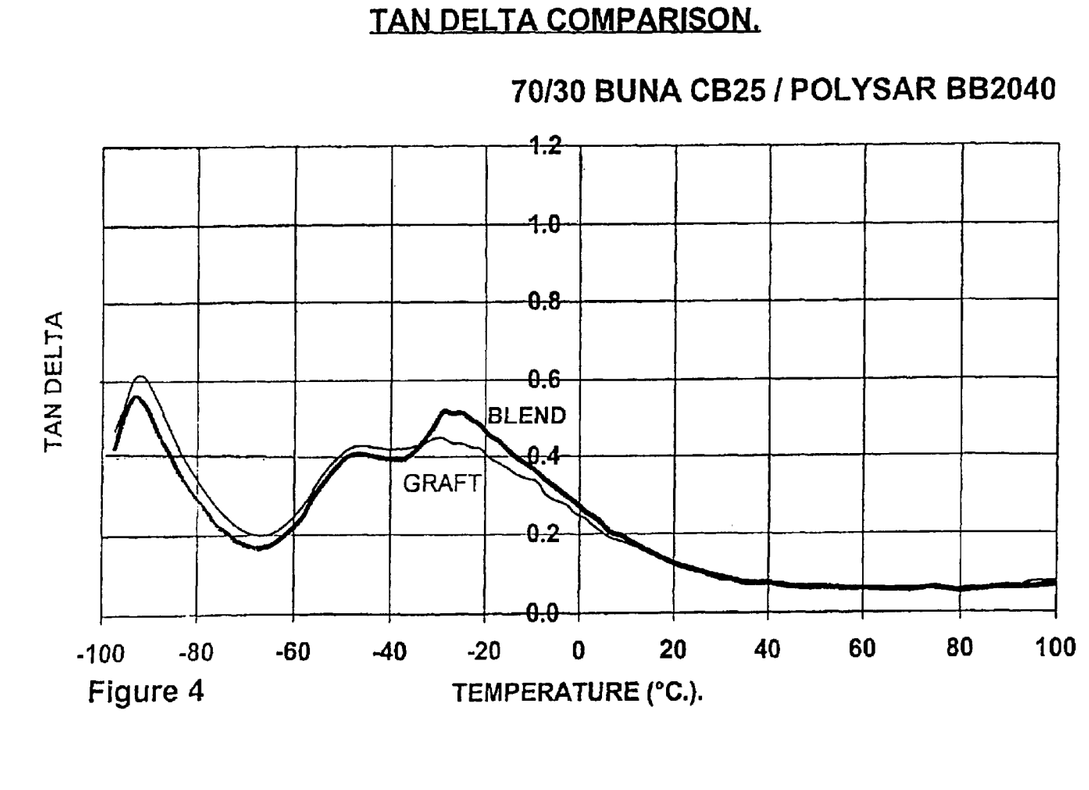
FIG. 4 illustrates the tan ($\delta$) versus temperature for a 70/30 blend of BUNACB25 and POLYSAR BB2040 and a 70/30 graft of BUNA CB25 and POLYSAR BB2040 formed by mixing in a Banbury mixer for 16 minutes with a dump temperature of 150° C.
Figure 5:
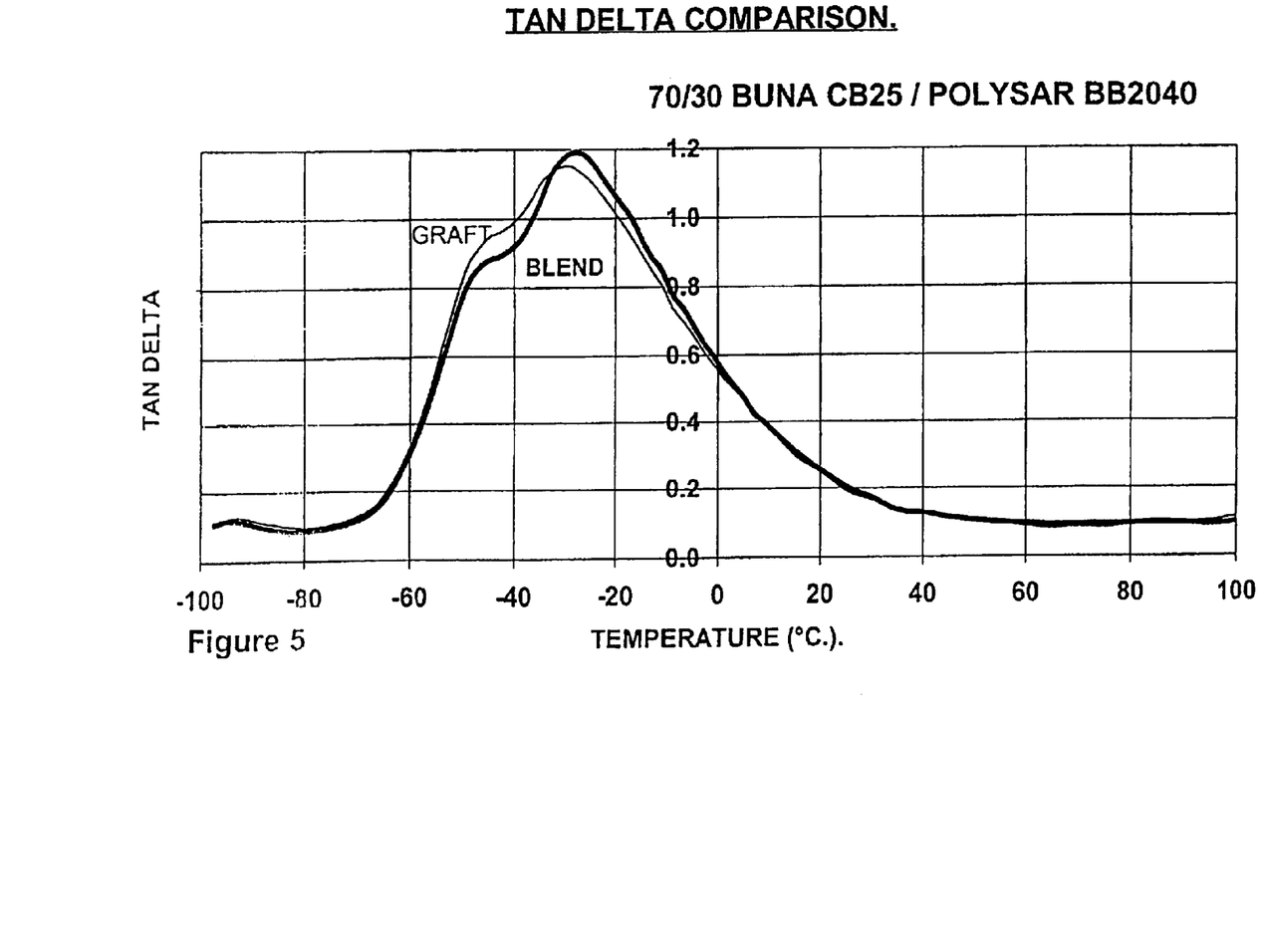
FIG. 5 illustrates the tan ($\delta$) versus temperature for a 30/70 blend of BUNA CB25 and POLYSAR BB2040 and a 70130 graft of BUNA CB25 and POLYSAR BB2040 formed by mixing in a Banbury mixer for 17 minutes with a dump temperature of 143° C.

FIGS. 3, 4 and 5 show the change in glass transition temperature, Tg, with the graft copolymers whose results are given in Table 1. FIG. 3 is a graph of tan (δ) versus temperature for a 50/50 blend of a brominated butyl rubber (POLYSAR BB2040) and sulphurised polymer based on conjugated diolefin monomers (BUNA CB25) and for 50/50 grafts of POLYSAR BB2040 with BUNA CB24 and BUNA CB25. Line 1 shows results obtained with a 50/50 mixture of POLYSAR BB2040 and BUNA CB25, grafted by mixing in a Banbury mixer for 16 minutes with a dump temperature of 147° C. Line 2 shows results obtained with a 50/50 mixture of POLYSAR BB2040 and BUNA CB24, grafted by mixing in a Banbury mixer for 16 minutes with a dump temperature of 147° C. Line 3 shows the results obtained with a 50/50 mixture of POLYSAR BB2040 and BUNA CB25, grafted by mixing in a Banbury mixer for 7 minutes with a dump temperature of 140° C. Line 4 shows results obtained with the ungrafted blend. The shift in peaks clearly shows a shift in glass transition temperature, Tg, caused by grafting.

FIG. 4 is a graph of tan (δ) versus temperature for a 70/30 blend of BUNA CB25 and POLYSAR BB2040 and also a graph for a 70/30 graft of BUNA CB25 and POLYSAR BB2040 formed by mixing in a Banbury mixer for 16 minutes with a dump temperature of 150° C.

FIG. 5 is a graph of tan (δ) versus temperature for a 30/70 blend of BUNA CB25 and POLYSAR BB2040 and also a graph for a 70/30 graft of BUNA CB25 and POLYSAR BB2040 formed by mixing in a Banbury mixer for 17 minutes with a dump temperature of 143° C.

Example 3

Blends of polybutadiene (BUNA CB24) with (a) brominated butyl rubber (POLYSAR BB 2040), (b) chlorinated butyl rubber (POLYSAR CB1240) and (c) non-halogenated rubber (POLYSAR PB301) were premixed on a cool two roll mill at 40–50° C. The blends were then returned to the two roll mill and mixed at higher rubber temperatures ranging from 80 to 120° C. for 15 to 60 minutes. The products were then dissolved in hexane. The blends with POLYSAR CB1240 and POLYSAR PB301 separated within two hours, indicating that grafting had not occurred, whereas the blend with POLYSAR BB2040 was slow to separate, indicating that grafting had occurred.

Example 4

50 parts polybutadiene (BUNA CB25) plus 50 parts brominated butyl rubber (POLYSAR BB2040), 5 parts polybutene (BP Chemicals; HYVIS 2000, Mol. Wt. 5900), and 1 part Irganox 3052FF (Ciba) were mixed on a mill at toom temperature. This blend was subsequently passed through a Berstorff corotating intermeshing twin screw extruder ZE-25. This extruder has a screw length of 1350 mm, and a diameter of 25 mm. Each pass typically took 2 to 3 minutes.

A number of reaction conditions were used as given in Table 3–5. A qualitative measurement of grafting was obtained by measuring the amount of separated polymer after the reacted blend had been dissolved in hexane. The lower the separated polymer the slower the separation and the greater the grafting.

TABLE 3

| Rotation speed (rpm) | Barrel temperature (° C.) | Extruder passes | Separation after 7 days |
|---|---|---|---|
| Control | | | 67.6 |
| 50 | 80 | 1 | 65.7 |
| 50 | 95 | 1 | 65.7 |
| 50 | 110 | 1 | 63.9 |
| 50 | 125 | 1 | 57.4 |
| 50 | 140 | 1 | 43.5 |
| 50 | 80 | 2 | 64.8 |
| 50 | 95 | 2 | 63.9 |
| 50 | 110 | 2 | 62.0 |
| 50 | 125 | 2 | 53.7 |
| 50 | 140 | 2 | 26.9 |

TABLE 4

| Rotation speed (rpm) | Barrel temperature (° C.) | Extruder passes | Separation after 7 days |
|---|---|---|---|
| Control | | | 70.8 |
| 50 | 125 | 1 | 66.7 |
| 50 | 125 | 2 | 63.3 |
| 50 | 125 | 3 | 25 |
| 50 | 125 | 4 | 0 |
| 50 | 140 | 1 | 31.7 |
| 50 | 140 | 2 | 0 |
| 50 | 140 | 3 | 0 |
| 50 | 140 | 4 | 0 |
| 100 | 140 | 1 | 53 |
| 100 | 140 | 2 | 0 |

Changes were made to the screw elements of the extruder with the results shown in Table 5.

TABLE 5

| Rotation speed (rpm) | Barrel temperature (° C.) | Extruder passes | Separation after 7 days |
|---|---|---|---|
| Control | | | 70.8 |
| 50 | 140 | 1 | 66.7 |
| 50 | 140 | 2 | 0 |
| 50 | 140 | 3 | 0 |
| 50 | 140 | 4 | 0 |

The data shown in tables 3–5 show that grafting was attained in the twin screw extruder, particularly using barrel temperatures above 110° C., and that increasing the residence time (increasing the number of passes) increased the degree of grafting

What is claimed is:

1. A process for preparing a graft copolymer of a brominated butyl rubber and a polymer based on a conjugated diolefin monomer comprising the steps of mixing solid brominated butyl rubber with a solid polymer based on a conjugated diolefin monomer wherein the polymer based on the conjugated diolefin monomer has C—S—$(S)_n$—C bonds, wherein n is an integer from 1 to 7, and wherein the mixing is carried out at a temperature greater than about 50° C. and for a time sufficient to cause grafting.

2. A process according to claim 1 wherein the mixing is carried out at a temperature in the range from 60° C. to 180° C.

3. A process according to claim 1 wherein the polymer based on a conjugated diolefin monomer is a polybutadiene.

4. A process according to claim 1 wherein the polymer based on a conjugated diolefin monomer is a styrene-butadiene copolymer.

5. A process according to claim 1 wherein from 90 to 10 parts by weight of the brominated butyl rubber are mixed with from 10 to 90 parts by weight of the polymer based on a conjugated diolefin monomer.

6. A process according to claim 5 wherein from 70 to 30 parts by weight of the brominated butyl rubber are mixed with from 30 to 70 parts by weight of the polymer based on a conjugated diolefin monomer.

7. A process according to claim 1 wherein the mixing is effected in an internal mixer.

8. A process according to claim 1 wherein the mixing is effected in an extruder.

9. A process according to claim 1 wherein the mixing is effected in part in an internal mixer and in part in an extruder.

10. A process according to claim 1, further comprising the steps of admixing the graft copolymer prepared according to claim 1 with a rubbery polymer selected from the group consisting of butadiene rubbers, styrene-butadiene copolymers, styrene-isoprene-butadiene copolymers and styrene-isoprene-butadiene rubber, and mixing with carbon black and vulcanizing agents, and curing to form a tire tread composition.

11. A graft polymer formed by a process comprising the steps of mixing solid brominated butyl rubber with a solid polymer based on a conjugated diolefin monomer wherein the polymer based on the conjugated diolefin monomer has C—S—$(S)_n$—C bonds, wherein n is an integer from 1 to 7, and wherein the mixing is carried out at a temperature greater than about 50° C. and for a time sufficient to cause grafting.

12. A rubber composition containing a graft-polymer and optionally one or more vulcanizing agents wherein the graft copolymer is formed by a process comprising the steps of mixing solid brominated butyl rubber with a solid polymer based on a conjugated diolefin monomer wherein the polymer based on the conjugated diolefin monomer has C—S—$(S)_n$—C bonds, wherein n is an integer from 1 to 7, and wherein the mixing is carried out at a temperature greater than about 50° C. and for a time sufficient to cause grafting.

13. A tire tread composition containing a graft-polymer and optionally one or more vulcanizing agents wherein the graft copolymer is formed by a process comprising the steps of mixing solid brominated butyl rubber with a solid polymer based on a conjugated diolefin monomer wherein the polymer based on the conjugated diolefin monomer has C—S—$(S)_n$—C bonds, wherein n is an integer from 1 to 7, and wherein the mixing is carried out at a temperature greater than about 50° C. and for a time sufficient to cause grafting.

14. A rubber composition according to claim 12 wherein the rubber composition is a vulcanized rubber.

15. A rubber article containing a rubber composition wherein the rubber composition contains a graft-polymer and optionally one or more vulcanizing agents wherein the graft copolymer is formed by a process comprising the steps of mixing solid brominated butyl rubber with a solid polymer based on a conjugated diolefin monomer wherein the polymer based on the conjugated diolefin monomer has C—S—$(S)_n$—C bonds, wherein n is an integer from 1 to 7, and wherein the mixing is carried out at a temperature greater than about 50° C. and for a time sufficient to cause grafting.

16. A rubber article according to claim 15 wherein said rubber article is a belt or roll.

17. A rubber article according to claim 15 wherein said rubber article is a dampening device.

* * * * *